US010395500B1

(12) United States Patent
Miller

(10) Patent No.: US 10,395,500 B1
(45) Date of Patent: Aug. 27, 2019

(54) SYNCHRONIZED, WRIST MOUNTED PERIMETER ALARMS

(71) Applicant: Aleta Miller, Gentry, AR (US)

(72) Inventor: Aleta Miller, Gentry, AR (US)

( * ) Notice: Subject to any disclaimer, the term of this patent is extended or adjusted under 35 U.S.C. 154(b) by 0 days.

(21) Appl. No.: 15/791,004

(22) Filed: Oct. 23, 2017

(51) Int. Cl.
| G08B 21/02 | (2006.01) |
| A44C 5/18 | (2006.01) |
| H04W 64/00 | (2009.01) |
| G08B 3/10 | (2006.01) |

(52) U.S. Cl.
CPC ............ G08B 21/0205 (2013.01); A44C 5/18 (2013.01); G08B 3/1016 (2013.01); H04W 64/003 (2013.01)

(58) Field of Classification Search
CPC .... G08B 21/0205; G08B 3/1016; A44C 5/18; H04W 64/003
USPC ...................................................... 340/573.4
See application file for complete search history.

(56) References Cited

U.S. PATENT DOCUMENTS

| 3,478,344 | A  | * | 11/1969 | Hurd ................... G08B 26/007 128/903 |
| 6,278,370 | B1 | * | 8/2001 | Underwood ....... G08B 21/0216 340/539.1 |
| 7,271,717 | B1 | * | 9/2007 | Amos ................ G08B 21/0202 340/522 |
| 9,747,770 | B1 | * | 8/2017 | Bartlett ............. G08B 21/0269 |
| 2008/0055072 | A1 | * | 3/2008 | Holoyda ........... G08B 21/0202 340/539.13 |
| 2010/0267361 | A1 | * | 10/2010 | Sullivan .................. G01S 19/17 455/404.2 |
| 2016/0070393 | A1 | * | 3/2016 | Sharma ................... G06F 1/163 345/174 |
| 2016/0073503 | A1 | * | 3/2016 | Singleton ............... H05K 1/181 361/767 |
| 2017/0061761 | A1 | * | 3/2017 | Kolla ................. G08B 21/0261 |

* cited by examiner

Primary Examiner — Omar Casillashernandez

(57) ABSTRACT

An alarm, locating and tracking apparatus is provided for the prevention a dependent from being lost from a caregiver. A transmitter that carried by each are programmed with a safe distance demarcation such that when a dependent travels past such a distance, an audible alarm sounds on both transmitters. This alarm is intended to prevent the dependent from becoming lost. Should the alarm fail to prevent such an incident, a location signal is transmitted to a local cellular telephone towers or by low earth orbiting satellites used for low power communication. When an adult or child is lost or in danger, the transmitter which sends a signal to a central reporting station or stations to provide location information to aid in the caregiver's search. The instant abstract is neither intended to define the invention disclosed in this specification nor intended to limit the scope of the invention in any way.

9 Claims, 5 Drawing Sheets

SYNCHRONIZED, WRIST MOUNTED PERIMETER ALARMS

RELATED APPLICATIONS

There are no previously filed, nor currently any co-pending applications, anywhere in the world.

BACKGROUND OF THE INVENTION

1. Field of the Invention

The present invention relates generally to location and tracking system and, more particularly, to wrist or ankle mounted tracking and locator device in communication with a cell phone perimeter setting application and in combination with a wrist band tamper alarm.

2. Description of the Related Art

Alzheimer's disease robs 4 million Americans of their ability to recognize familiar places and faces. Many cannot remember their own names and addresses. They may become disoriented and lost, in their own neighborhoods and far from home.

As many as 7 of 10 people with Alzheimer's Disease will wander off and get lost sometime during the course of the Disease, and many do so repeatedly. Each time, their lives are endangered and families worried.

Additionally, each year in U.S. alone there are hundreds of thousands of children that are reported as victims of family abductions (i.e. in breach of custodial rights) as well as tens of thousand more that are victims of non-family abductions.

The concerns of each group have a large degree of overlap, i.e. allow children or the elderly with a degree of autonomy of movement within a normal, ordinary or customary zone or area, which may change based upon time, function or location, while still allowing for a tracking to determine an aberration in behavior and alarming to aid before the person is lost or taken.

Consequently, need has therefore been felt for an improved wrist mounted tracking and locator device in combination with the exit warning monitor, locator tracking beacon and wrist band locking means.

SUMMARY OF THE INVENTION

Therefore, it is an object of the invention to provide for wrist mounted tracking and locator device.

It is another object of the present invention to provide for a wrist mounted tracking transmitter that includes a band removal alarming means to warn of accidental or unauthorized removal of the tracking and locator device.

It is still a further object of the present invention to provide a such a wrist mounted tracking transmitter that may be used in conjunction with a smart phone application in order to vary an acceptable zone demarcation for alarming.

It is another object of the present invention to provide for a wrist mounted tracking transmitter that generates a local alarm signal when the device is removed in an unintended manner.

Briefly described according to one embodiment of the present invention, a first wrist mounted tracking and locator device is provided that includes a wrist band having a tamper alarm means to prevent accidental or unauthorized removal of the transmitter. A similar second wrist band is electronically synchronized with the first. Transmitter range perimeters between the two may be adjusted to allow for variation in distances to allow the wearer of the first wrist band to be able to move about within a desired perimeter. Should the user, albeit a child or a senior suffering from dementia, move out of this perimeter an alarm will sound on both bracelet simultaneously to alert a caregiver of the potential hazzard before it is too late. The alarm is turned off with a code or other type of authentication on the second bracelet. The bracelet may include a band having a metal wire core with rubber coating that is secured to a wrist or ankle in a manner that prevents unauthorized tampering or removal. Upon cutting or breaking of the internal wire, the alarms will similarly annunciate to prevent unauthorized removal.

The synchronized, wrist mounted perimeter alarms may be used with small children, as a deterrent to abduction, or with elderly who may be diagnosed with dementia or Alzheimer's who have a high probability of straying away from their home. The alarm will sound should they leave the perimeter set on the bracelet. Once the alarm goes off a tracking location is sent to the parent (if child)/caregiver (if elderly) phone. It is intended that the tracking be a backup measure and one that hopefully would not be needed due to the sounding of the alarm resulting in assistance before any tracking location is necessary.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
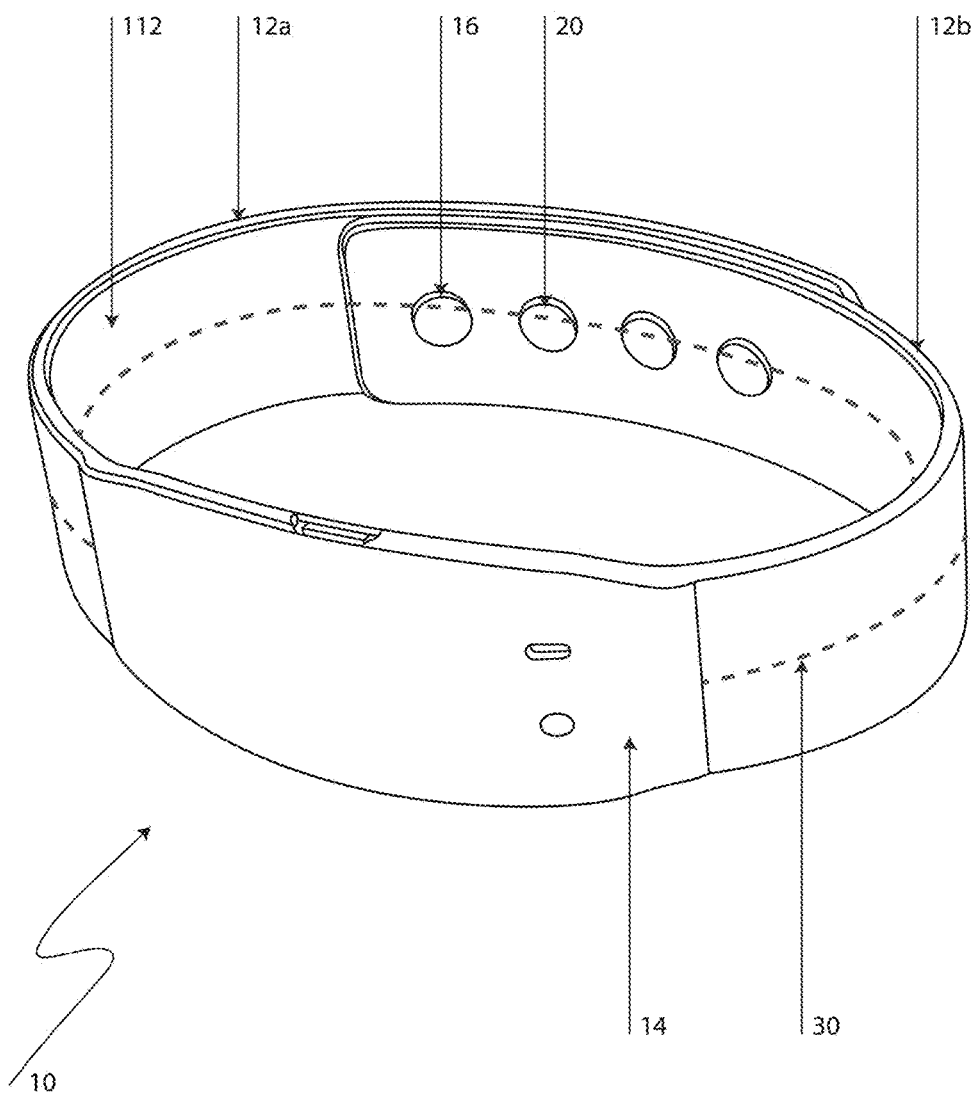
FIG. 1 is a front perspective view of a wrist mounted perimeter alarm for use with the preferred embodiment of the present invention.
Figure 2:
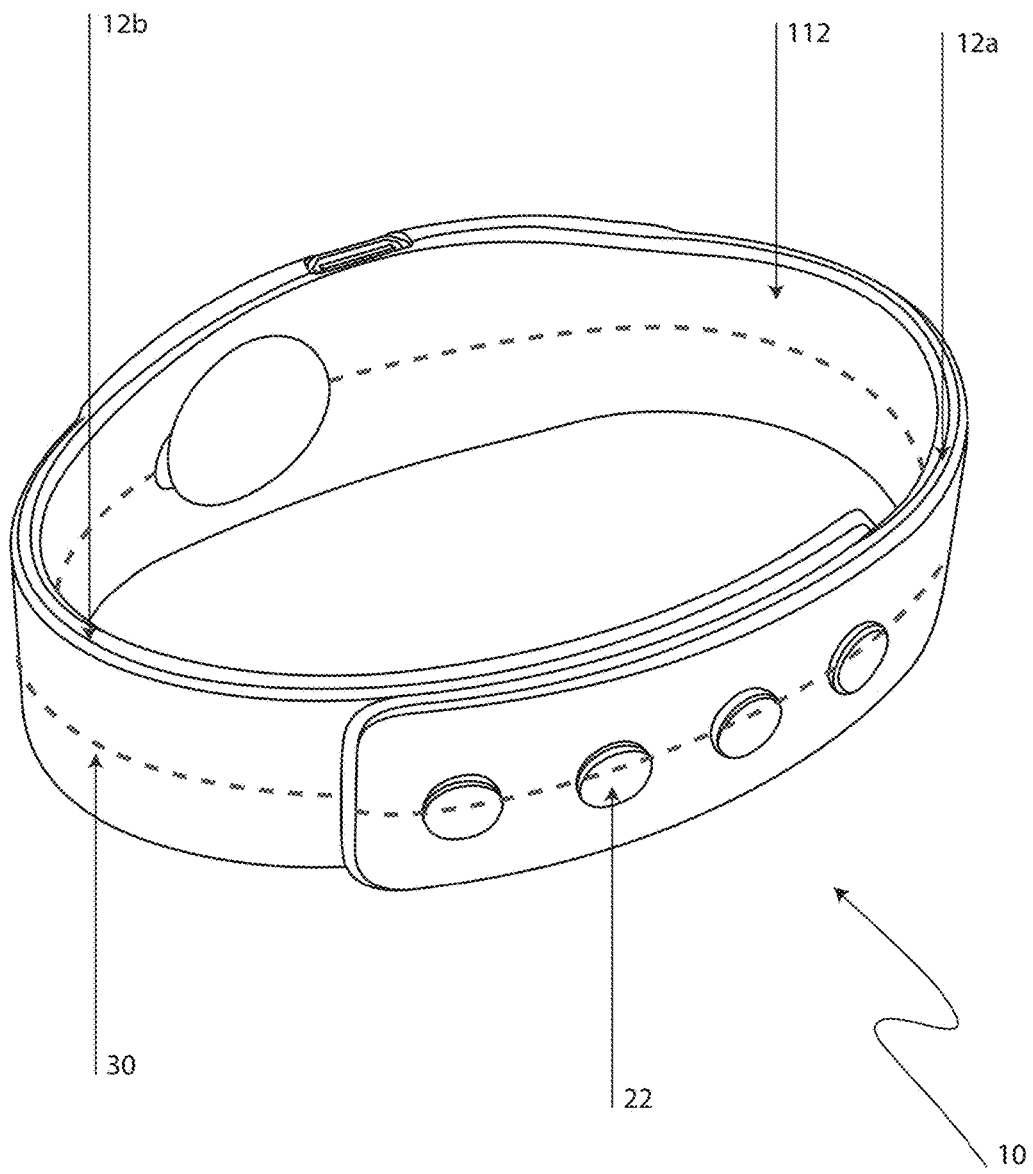
FIG. 2 is a rear perspective view thereof.
Figure 3:
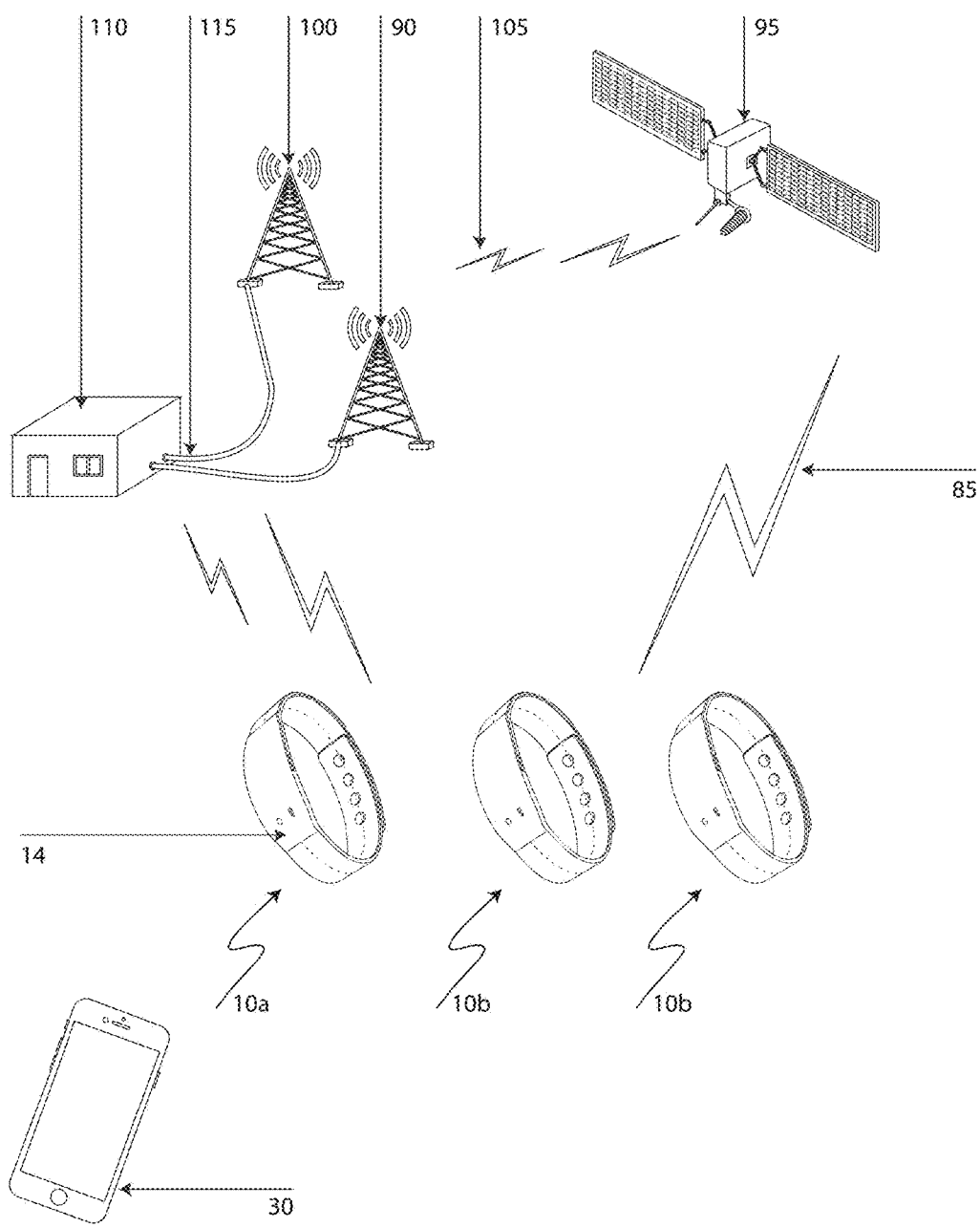
FIG. 3 is a system diagram of the child locating and tracking apparatus showing the radio frequency travel paths as utilized by the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Referring now to the drawings, wherein like reference numerals indicate the same parts throughout the several views, a wrist mounted tracking and locator device 10 is provided that is supported on a user's wrist by a wrist band 12. The wrist band 12 is formed of a transmitter module 14 supported with in the band 12 which extends as a pair of linearly elongated band members 12a, 12b adapted to circumscribe a user's wrist or ankle. Terminating each band member 12a, 12b are interlocking components of a wrist band locking means 16.

The wrist band locking means 16 comprises a male insertion end 20 for inserting into a female retaining end 22. An encapsulated locking wire 30 encircles the band 12 and links the male insertion end 20 to the female retaining end 22 in order to prevent accidental or unauthorized removal of the transmitter.

The wrist mounted tracking and locator device 10 is anticipated as being utilized in pairs, including a caregiver device 10a and a dependent device 10b. A local alarm perimeter distance "L" is provided that forms a demarcation distance for activation of a local proximity alarm. According to one aspect of the present invention, the local alarm perimeter distance "L" may be fixed or adjusted to a desired distance from a reference position. In the instance where the device 10 is being used in an 'indoor' mode, i.e. inside a building or crowded area, the distance "L" may be referenced from a caregiver's device 10a. Alternately, in the instance where the device 10 is being used in an 'outdoor' mode, i.e. while outside or on a trip or otherwise remotely away from the caregiver, the distance "L" may be referenced from a specified location (e.g. a building such as a school), or coordinate. According to yet another aspect of the present invention, the local alarm perimeter distance "L" may be adjusted utilizing a smart phone application 30, thereby allowing changes in the perimeter distance "L" to be modified through the use of a cell phone application in Bluetooth® or similar wireless communication with the caregiver device 10a.

Further, the pair of tracking and locator devices 10a, 10b are in wireless communication with one another, either through Bluetooth®, WiFi® or similar or equivalent wireless local area network. The perimeter distance "L" provides a demarcation between a non-alarm distance (i.e. distance≤"L") and an alarm distance (i.e. distance>"L") such that when a distance between devices 10a and 10b exceeds the selected range, an audible alarm 32 incorporated within the transmitter module 14 is annunciated in a manner that cannot be terminated by the dependent device 10b itself, but rather only through an acknowledgment at the caregiver device 10a or through the smart phone application 30.

Figure 4:
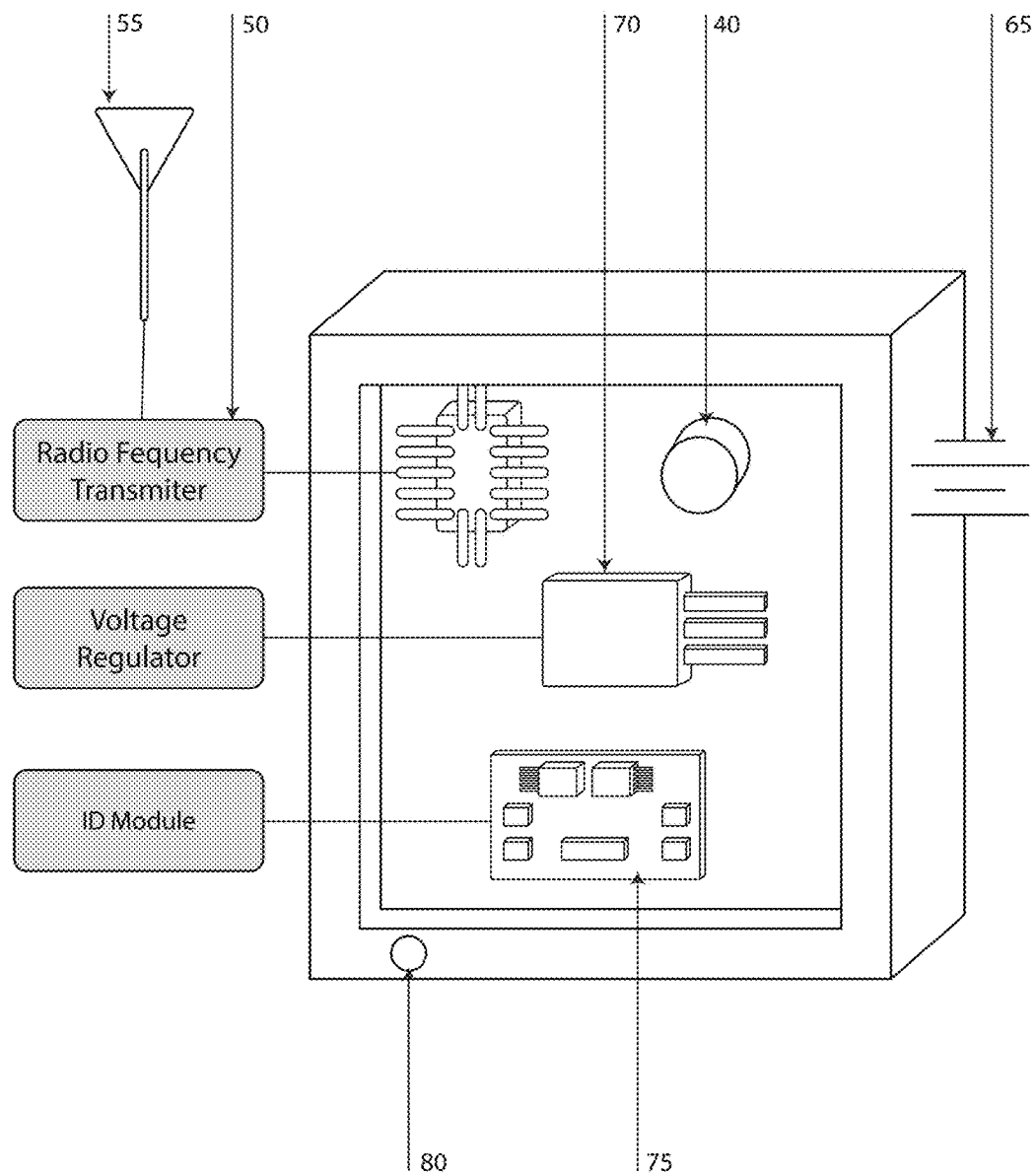
FIG. 4 is a functional electrical block diagram of the associated circuitry as used with the transmitter portion of the child locating and tracking apparatus.

Referring next to FIG. 4, a functional electrical block diagram of the associated circuitry as used with the wrist mounted tracking and locator device 10 is depicted. A radio frequency transmitter 50 provides an output signal to an antenna 55. The transmitter may use the 2.4 gigahertz, 3.6 gigahertz, 5 gigahertz or 60 gigahertz radio bands. The antenna 55 is envisioned to be of a loop type that may be embedded in the perimeter of the transmitting module 14, though it may be seen by those familiar in the art that other types such as microwave, dipole, multiple array and other type antennas will work equally as well and is not intended to be a limiting factor. A battery 65 provides input power to a voltage regulator module 70 as shown. In the event of low power output from the battery 65, an electrical signal is applied to the battery level indication light 40. It is envisioned that the voltage regulator module 70 would be capable of providing a sufficient advance warning that the battery 65 is depleted of power before the battery 65 ceases to function. Output power from the voltage regulator module 70 is applied to the radio frequency transmitter 50 and to an identification module 75. The identification module 75 is individually unique for each tracking apparatus 10 such that a signature is applied to the radio frequency transmitter 50 through a digital signal path 80 as shown.

All components as shown in FIG. 4 are envisioned to be of the microminiature nature and perhaps combined by use of Very Large Scale Integration or future electrical assembly method still under development.

Figure 5:
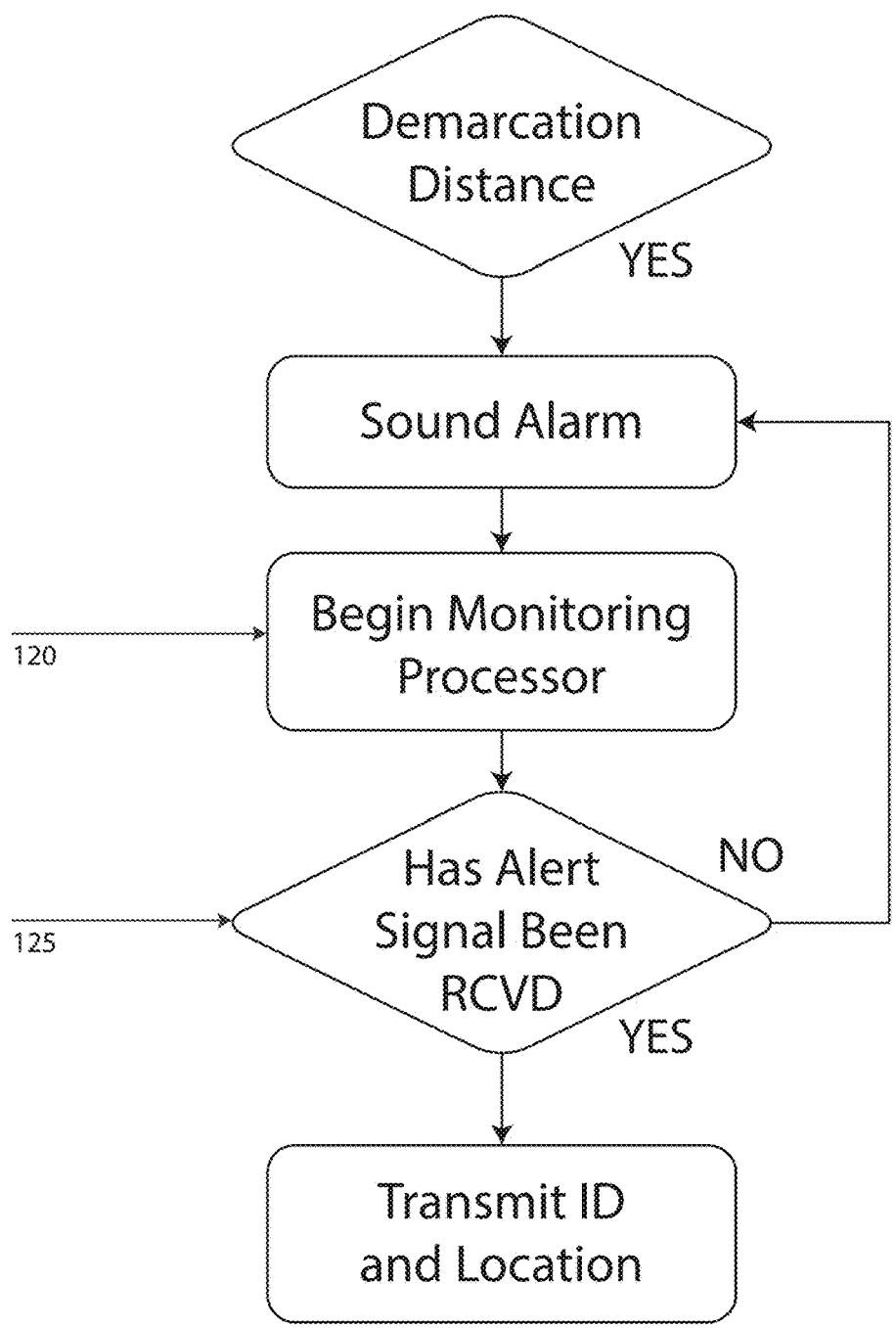
FIG. 5 is a flow diagram depicting the decision tree as used by the monitoring station personnel in determining the safety of a child utilizing the child locating and tracking apparatus.

Referring finally to FIG. 5, a flow diagram depicting the decision tree as used in determining the safety of a dependent utilizing the locating and tracking apparatus 10 is depicted. The process begins at a first operational block 120 which describes the process of waiting for a received first radio frequency signal 85 (as shown in FIG. 4). If no signal is received, a first functional block 125, by way of a negative response, dictates that the process continues. If a positive response results, it must be determined that the signal is from a transmitting module 14 (as shown in FIG. 4) that is not on an inactive list as shown by a second functional block 130. Such transmitting module 14 that would be on an inactive list would be those that are not assigned to a child, those that are lost, or those from a child that is known to be safe. If such a signal is received from those transmitting module 14 that are known to be inactive, a positive response indicates that the monitoring process should begin again at the first operational block 120. If a negative response is received at the second functional block 130, local monitoring personnel or equipment will contact the parents or authorized guardians as dictated by a second operational block 135. If, after conversation or input from a caregiver, it is determined that the dependant is not in danger, a negative response at a third functional block 140 dictates that the number corresponding to the said received signal be added to the inactive list as shown by a third operational block 145. The corresponding number will remain on the inactive list until the parent or authorized guardian calls the monitoring station 110 and reactivates the associated transmitting module 14. If a positive answer or no response is received at the third functional block 140, a fourth operational block 150 dictates that the appropriate law enforce-

2. Operation of the Preferred Embodiment

To use the present invention, after purchase a caregiver would register the dependant along with the associated number of the locating and tracking apparatus 10 and corresponding transmitting module 14 with the monitoring station 110. Additionally, the demarcation distance "L" would be set and the system activated.

As long as the distance between the devices 10a, 10b are within the alarm limit "L", no action is needed or required. Once the dependant's device 10b is moved outside of the alarm limit "L", an audible alarm 30 would annunciate in order to prevent the parties from losing track of each other. In the event that the prophylactic alarm fails to prevent the caregiver from being unable to identify the location of the dependant, the tracking signal via a radio frequency signal 85 is emitted to a local ground station 90 or a low earth orbit satellite 95 which would result in a land-based communication path 115 being established to a monitoring station 110 bearing the identification number of the respective transmitting module 14 and therefore the respective child.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

Having thus described the invention what is claimed as new and desired to be secured by Letters Patent is as follows:

1. A personnel locating and tracking system consisting of: a first transceiver formed of a smartphone operationally adapted with a mobile application for use by a caregiver and operatively connected to a first audible alarm; a second transceiver module adapted to be wrist or ankle mounted on a dependent and operatively connected to a second audible alarm, said second transceiver module further comprising: a bracelet; a locking mechanism; and a switch for generating a signal upon an unlocking of the locking mechanism; a wireless local area network including said first transceiver and said second transceiver and communicating through the mobile application an alarm distance between said first transceiver and said second transceiver; and a first activation circuit in operative communication by the application with said first transceiver module for activating said first audible alarm when said alarm distances has exceeded a predetermined distance; and a second activation circuit in operative communication with said second transceiver module for activating said second audible alarm when said alarm distance has exceeded the predetermined distance or upon activation of the signal from the switch and for identifying a location and an identification of said second transceiver module.

2. The personnel locating and tracking system of claim 1, wherein said first transceiver further comprises:
a unique identifier for every child locating and tracking apparatus and possessing a unique digital binary signature, such that said signature is communicated through a the mobile application.

3. The personnel locating and tracking system of claim 2, wherein
said second transceiver module is supported on a user's wrist by a wrist band, said wrist band formed of a transmitter module supported with in the band which extends as a pair of linearly elongated band members adapted to circumscribe a user's wrist or ankle; and
said locking mechanism terminating each band member comprising a male insertion end for inserting into a female retaining end.

4. The personnel locating and tracking system of claim 3, further comprising an encapsulated locking wire that encircles the band and links the male insertion end to the female retaining end in order to prevent accidental or unauthorized removal of the transmitter.

5. A personnel locating and tracking system comprising a pair of wrist bands of claim 4 and electronically synchronized with each other and having a transmitter range perimeters between the two that may be adjusted to allow for variation in distances to allow the wearer of the first wrist band to be able to move about within a desired perimeter.

6. A personnel locating and tracking system comprising a pair of wrist bands of claim 4 and electronically synchronized with each other and having a transmitter range perimeter based upon a pre-authorized remote reference point that may be adjusted to allow for variation in distances to allow the wearer of the first wrist band to be able to move about within a desired perimeter.

7. A personnel locating and tracking system comprising a pair of wrist bands of claim 5 and electronically synchronized with each other and having a transmitter range second perimeter based upon a pre-authorized remote reference point that may be adjusted to allow for variation in distances to allow the wearer of the first wrist band to be able to move about within a desired second perimeter.

8. The personnel locating and tracking system of claim 1, wherein said first audible alarm further comprises a location identifier of the second transceiver module including at least a location of the second transceiver module upon initiation of said first audible alarm.

9. The personnel locating and tracking system of claim 8, wherein said location identifier available via the mobile application.

* * * * *